(12) United States Patent
Nagai et al.

(10) Patent No.: US 9,039,868 B2
(45) Date of Patent: May 26, 2015

(54) SHEET MANUFACTURING APPARATUS

(71) Applicant: SEIKO EPSON CORPORATION, Tokyo (JP)

(72) Inventors: Yoshiyuki Nagai, Nagano (JP); Shunichi Seki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/223,104

(22) Filed: Mar. 24, 2014

(65) Prior Publication Data

US 2014/0290886 A1    Oct. 2, 2014

(30) Foreign Application Priority Data

Mar. 27, 2013  (JP) .................................. 2013-065795
Feb. 13, 2014  (JP) .................................. 2014-025120

(51) Int. Cl.
*D21F 1/48*     (2006.01)
*D21H 25/04*   (2006.01)
*D21B 1/08*    (2006.01)
*D21F 9/02*    (2006.01)
*D21G 9/00*    (2006.01)

(52) U.S. Cl.
CPC .................. *D21H 25/04* (2013.01); *D21B 1/08* (2013.01); *D21F 9/02* (2013.01); *D21G 9/0036* (2013.01)

(58) Field of Classification Search
USPC ............................................. 162/252, 261, 4
See application file for complete search history.

(56) References Cited

U.S. PATENT DOCUMENTS

2014/0027075 A1*  1/2014 Yamagami et al. ............... 162/4

FOREIGN PATENT DOCUMENTS

EP         2664708 A1     11/2013
JP         2012-144819 A   8/2012

OTHER PUBLICATIONS

JP-2011-005573, Yamagami et al., Feb. 2012.*

* cited by examiner

*Primary Examiner* — Mark Halpern
(74) *Attorney, Agent, or Firm* — Global IP Counselors, LLP

(57) ABSTRACT

A sheet manufacturing apparatus includes a defibrating unit configured to defibrate a defibration object including at least a fiber, in air. The sheet manufacturing apparatus forms a sheet by adding quantity of heat to a defibrated material defibrated at the defibrating unit. The sheet manufacturing apparatus includes a measuring unit configured to acquire moisture amount information of the defibrated material or the defibration object, and a controller configured to control the quantity of heat to be added to the defibrated material on the basis of the moisture amount information.

8 Claims, 12 Drawing Sheets

SHEET MANUFACTURING APPARATUS

CROSS-REFERENCE TO RELATED APPLICATIONS

This application claims priority to Japanese Patent Application No. 2013-065795 filed on Mar. 27, 2013 and Japanese Patent Application No. 2014-025120 filed on Feb. 13, 2014. The entire disclosure of Japanese Patent Application Nos. 2013-065795 and 2014-025120 is hereby incorporated herein by reference.

BACKGROUND

1. Technical Field

The present invention relates to a sheet manufacturing apparatus.

2. Related Art

There has been a demand that used paper is processed in office in view of confidentiality because the used paper abandoned in the office may contain confidential material. Wet type sheet manufacturing apparatuses are not suitable to a small scale office because the wet type sheet manufacturing apparatuses use large amount of water. Dry type sheet manufacturing apparatuses which have simple structures have been suggested (for example, please see Japanese Unexamined Laid Open Patent Publication No. 2012-144819).

However, even if the sheet manufacturing apparatuses use same sheet material and perform pressurizing and heating in same way, it is possible that the sheet lacks strength. Inventors of the present invention have found that it is because moisture amount in the stock material has large impact to quality of the sheet being produced.

This is because quantity of heat in heating and pressurizing is used in evaporating the moisture mount in the stock material, when the moisture mount is relatively large. Thus, the quantity of heat to tie fibers is not enough, and the strength of the sheet decreases. On the other hand, the quantity of heat in heating and pressurizing is surplus, when the moisture mount in the stock material is relatively small. Thus, resin to tie the fibers is fused too much and spread, the remaining amount to tie the fibers is not enough. However, there has been no disclosure regarding the impact of the moisture amount to the strength of the sheet.

SUMMARY

The present invention was made to solve at least part of the above mentioned problems, and is capable of actualizing as the following embodiments or applied examples.

A sheet manufacturing apparatus according to a present example includes a defibrating unit configured to defibrate, in air, a defibration object which includes at least fibers. The sheet manufacturing apparatus forms a sheet by adding quantity of heat to a defibrated material that has been defibrated by the defibrating unit. The sheet manufacturing apparatus includes a measuring unit configured to acquire moisture amount information of the defibrated material or the defibration object, and the quantity of heat added to the defibrated material is controlled on the basis of the moisture amount information of the defibrated material.

With this configuration of the sheet manufacturing apparatus, the moisture amount of the defibrated material or the defibration object is acquired, and the quantity of heat corresponding to acquired moisture amount is added to the defibrated material. In this way, even though the moisture amount of the defibrated material being fed is different, the quantity of heat is adjusted on the basis of the moisture amount. Therefore, it is possible to prevent decreasing the strength by the heat surplus which fuses a resin component when pressurizing and heating each defibrated material, and decreasing the strength by the lack of heat which causes the lack of the tire between fibers and resin.

The sheet manufacturing apparatus according to the above mentioned example is characterized in making the quantity of heat larger when the moisture amount in the defibrated material, in the moisture amount information, is larger relative to when the moisture amount is smaller.

With this configuration of the sheet manufacturing apparatus, the tie strength and eventually the strength of the sheet is enhanced by adding more quantity of heat when the moisture amount in the defibrated material is larger. On the other hand, adding the quantity of heat is inhibited when the moisture amount in the defibrated material is small. The strength of the sheet is thus enhanced.

The sheet manufacturing apparatus according to the above mentioned example is characterized in that the quantity of heat is based on at least one of heating temperature added to the defibrated material and a time for which the heating temperature is added to the defibrated material.

With this configuration of the sheet manufacturing apparatus, the quantity of heat is controlled by controlling, on the basis of the moisture amount information, the heating temperature to be added to the defibrated material and the time for which the heating temperature is added. The strength of the sheet is thus enhanced.

A sheet manufacturing apparatus according to the present example includes a defibrating unit configured to defibrate, in air, a defibration object which includes at least fibers. The sheet manufacturing apparatus forms a sheet by adding quantity of heat to a defibrated material that has been defibrated by the defibrating unit. The sheet manufacturing apparatus includes a measuring unit configured to acquire moisture amount information of the defibrated material or the defibration object, and the moisture amount of the defibrated material is controlled on the basis of the moisture amount information of the defibrated material or the defibration object.

With this configuration of the sheet manufacturing apparatus, the moisture amount in the defibrated material or in the defibration object is acquired and the moisture amount after being acquired is adjusted. In this way, even though the defibrated material with different moisture amount is fed, the moisture amount will be adjusted to be constant. Therefore, when heat-forming the defibrated material, it is possible to make the defibrated material to have constant moisture amount. It is also possible to prevent decreasing the strength by the heat surplus which fuses a resin component away, and decreasing the strength by lack of tine by lack of heat between fibers and the resin component.

The sheet manufacturing apparatus according to the above mentioned example is characterized in that the moisture amount of the defibrated material or the defibration object is made constant on the basis of the moisture amount information.

With this configuration, the moisture amount of the defibrated material or the defibration object is made constant on the basis of the moisture amount information. Thus, the strength of the sheet is enhanced.

The sheet manufacturing apparatus of the above mentioned example is characterized in that the moisture amount is made constant by drying the defibrated material or the defibration object.

With this configuration, the moisture amount of the defibrated material is easily made constant by drying. The strength of the sheet is thus enhanced.

The sheet manufacturing apparatus of the above mentioned example is characterized in that the sheet manufacturing apparatus forms the sheet by pressurizing and heating the defibrated material that has been dried.

With this configuration, in a state where the moisture amount of the defibrated material is constant, the sheet manufacturing apparatus performs pressurizing and heating. Therefore, the strength of the sheet is enhanced.

The sheet manufacturing apparatus according to the above mentioned example is characterized in that the moisture amount is made constant by adding moisture to the defibrated material to the defibration object.

With this configuration, the moisture amount of the defibrated material is easily made constant by adding the moisture. Therefore, the strength of the sheet is enhanced.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
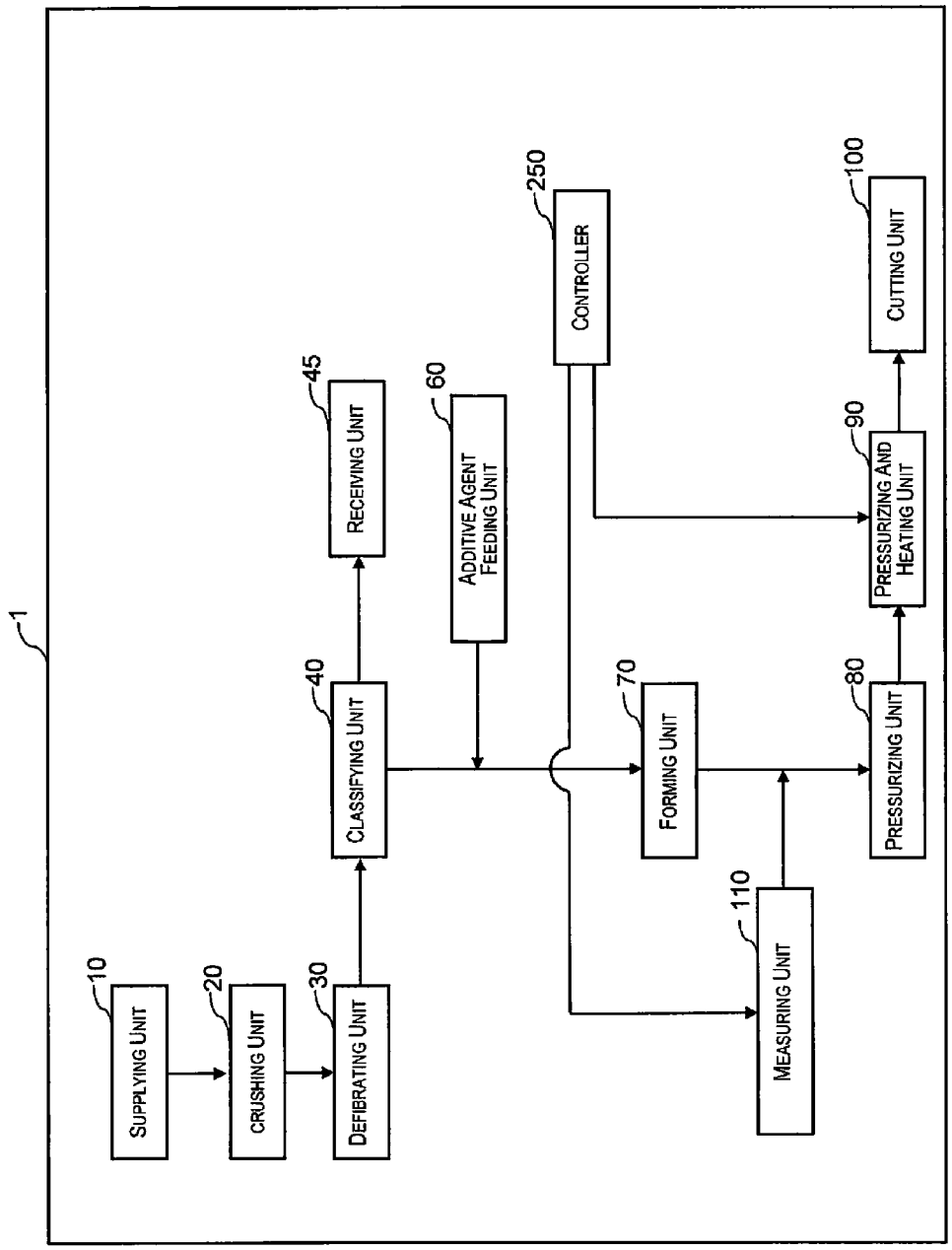
FIG. 1 is a schematic view of a sheet manufacturing apparatus according to a first embodiment.

First to fourth embodiments of the present invention are described with reference to the drawing.

First Embodiment

First, a configuration of a sheet manufacturing apparatus is described. The sheet manufacturing apparatus is based on an art in recycling defibration object, such as used paper (with stock material Pu or pulp sheets) to new sheets. The apparatus controls quantity of heat to be added to defibrated material on the basis of moisture amount information of the defibrated material. A stock material of the defibration object is supplied to the sheet manufacturing apparatus in the present embodiment. An example of the stock material is used paper in A4 size which is typically used in the office. It will be specifically described hereinafter.

Figure 2:
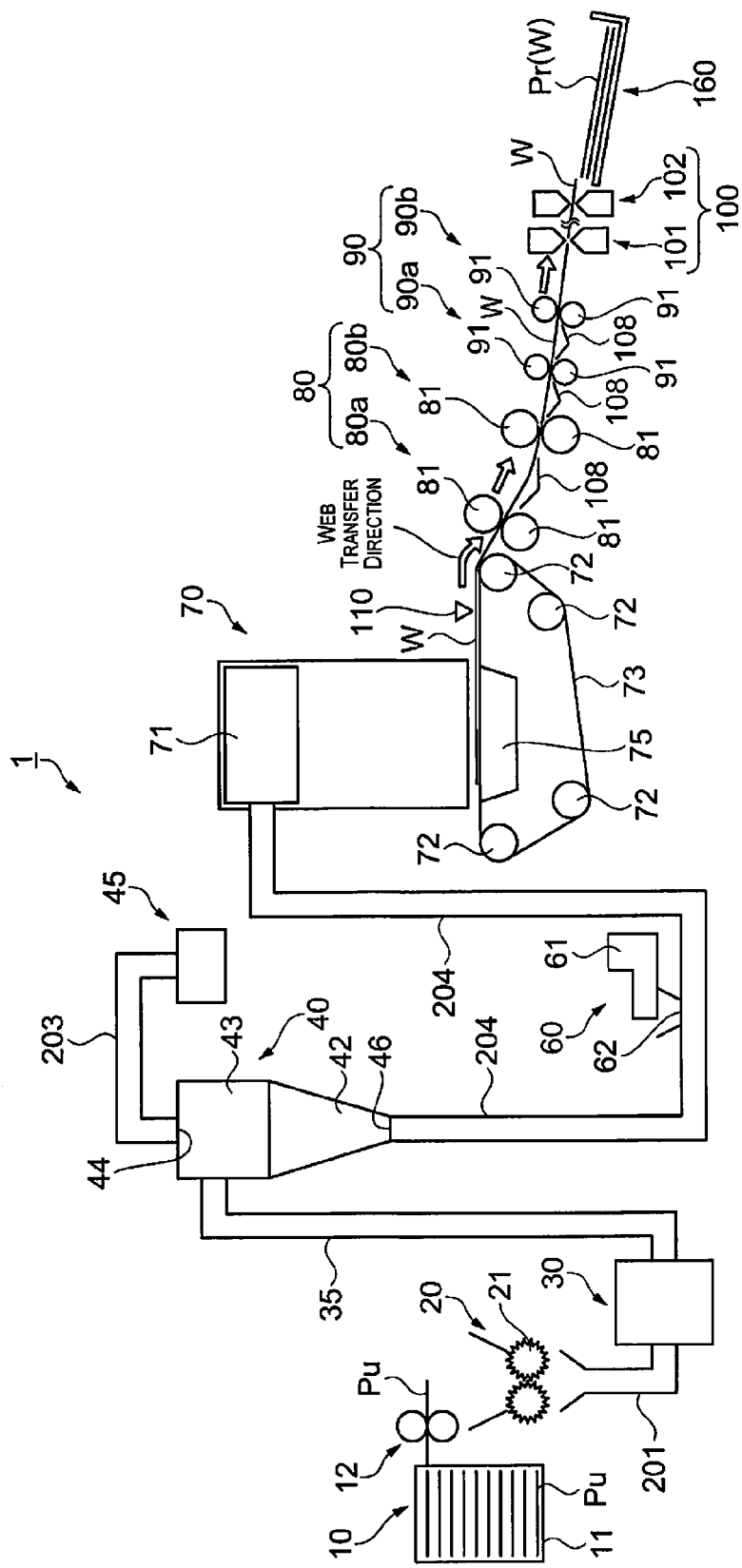
FIG. 2 is a schematic view of the sheet manufacturing apparatus according to the first embodiment.

FIGS. 1 and 2 are the schematic views which show configurations of the sheet manufacturing apparatus. As shown in FIGS. 1 and 2, the sheet manufacturing apparatus 1 includes a supplying unit 10, a crushing unit 20, a defibrating unit 30, a classifying unit 40, a receiving unit 45, an additive feeding unit 60, a forming unit 70, a pressurizing unit 80, a pressurizing and heating unit 90, and a cutting unit 100. Further, the sheet manufacturing apparatus 1 includes a measuring unit 110 which acquires moisture amount information of defibrated material. The measuring unit 110 is configured on an upstream side of the pressurizing and heating unit 90. In the present embodiment, the measuring unit 110 is configured on an upstream side of the pressurizing and heating unit 90, and is configured to acquire the moisture amount information of the defibrated material right before being fed to the pressurizing and heating unit 90. Moreover, the sheet manufacturing apparatus 1 further includes a controller 250 which controls these portions. The moisture amount information is information with regards to moisture amount in defibrated material. For example, the moisture amount, moisture content ration, or humidity per unit volume of the defibrated material.

The supplying unit 10 supplies stock material Pu as the defibration object to the crushing unit 20. The supplying unit 10 includes, for example, a plurality of trays 11 on which the stock material Pu is stacked, an automatic feeding mechanism 12 which is capable of continuously feeding the stock material Pu being stacked on the tray 11 to the crushing unit 20, and the like.

The crushing unit 20 cut the stock material Pu supplied into small pieces of few centimeter squares. The crushing unit 20 includes a crushing blade 21 with a cutting width being wider than a cutting width of a blade of an ordinary shredder. With this, the stock material Pu being supplied is easily cut into small pieces. And then the small pieces are supplied to the defibrating unit 30.

The defibrating unit 30 includes a rotary blade which rotates and defibrates the small pieces which are supplied from the crushing unit 20 into a fibrous (fluffy) form. The defibrating unit 30 of the present embodiment is a dry-defibrating type which defibrates in the air, not in the water. The defibrating unit 30 can be a dry defibrating apparatus including a disk refiner, Turbo-Mill (made by Turbo Kogyo Co., Ltd.), Ceren-Miller (made by Masuko Sangyo Co., Ltd.), a wind generation mechanism, or the like. It is fine that size of the small pieces fed to the dry type defibrating unit 30 is same as size of the small pieces discharged from ordinary shredder. A defibrating process of the defibrating unit 30 releases ink and a coating material such as bleed prevention agent and the like from the stock material (hereinafter ink particle). Thus, the defibrated material which is discharged from the defibrating unit 30 includes the fiber and the ink particle by defibrating the small pieces. And air stream is generated by rotation of the rotary blade. The defibrated material is transferred to the air stream to the classifying unit 40. When the defibrating unit 30 of the dry type without a wind generation mechanism is used, an air-stream generating apparatus which generates the air stream from crushing unit 20 to defibrating unit 30 is better to be equipped.

The classifying unit 40 classifies by air the defibrated material being transferred into the ink particles and fibers, and remove the ink particles. In the present embodiment, the cyclone 40 is employed as the classifying unit 40. It is preferable for the cyclone 40 to be a cyclone of a tangent input system because its structure is relatively simple. Other airflow-type classifiers can be used instead of the cyclone 40. In this case, an airflow-type classifier other than the cyclone 40 can be, for example, Elbow-Jet, EID classifier, or the like. The airflow-type classifier generates swirling airflow, separates by a difference in centrifugal force due to size and density of the defibrated material, and classify. The airflow-type classifier can adjust a classification point by adjusting velocity of the air stream and the centrifugal force.

The cyclone 40 of the present embodiment includes an inlet port continuous from the defibrating unit 30, a cylindrical portion 43 to which the inlet port is attached in the direction of tangent, circular cone portion 42 continuous from the cylindrical portion 43, a lower outlet configured on a lower part of the circular cone portion 42, and a upper exhaust port 44 which is configured at a upper middle part of the cylindrical portion 43 for fine powder discharging.

In the classifying process, the air stream including the defibrated material from the inlet port of the cyclone 40 is changed to a circular movement at the cylindrical portion 43, is transferred to the circular cone portion 42, and then separated and classified by the difference in the centrifugal force due to the size and the density of the defibrated material. When the defibrated material is categorized into two, namely the fibers and the ink particles other than the fibers, the fibers are larger than the ink particles, or denser. For that reason, the defibrated material is separated in the classifying process into the ink being smaller in the size and smaller in the density than the fibers and the fibers larger in the size and larger in the density than the fibers. The ink particles after being separated is directed to the upper exhaust port 44 as fine powder with the air. Then, the ink particle is discharged from the upper exhaust port 44 of the cyclone 40. The ink particle after being discharged is collected by a receiving unit 45 from the upper exhaust port 44 of the cyclone 40 through a piping 203. On the other hand, the fibers being larger in density and larger in the size are transferred as defibrated fibers to a forming unit 70 from the lower outlet 46 of the cyclone 40. The ink particles are removed and deinked from the defibrated material by this.

The additive feeding unit 60 is configured on the piping 204 somewhere between the cyclone 40 and the forming unit 70 where the defibrated fibers are transferred. The additive feeding unit 60 adds additive substance to the defibrated fibers. Examples of the additive substance are a fusion-bondable resin, a flame retardant, a whiteness enhancer, a strengthening agent, or a sizing agent. However, the additive agent can be entirely or partially omitted. Further, other additive substance can be added as well. The additive agent is stored at the storing portion 61 and is fed from the feeding port 62 by a feeding mechanism which is not shown in the figures.

The fusion-bondable resin maintains the strength of the sheet formed from the defibrated fibers, prevents the paper powder from flying apart, and contributes in maintaining the form of the sheet. The fusion-bondable resin is fusion-bonded and tied with the fibers by being added to the defibrated fibers. The fusion-bondable resin can be in a fibrous form, a powder form, or the like, as long as the fuse resin is fused by a heating process. Preferably, the fuse resin is fused under 200 degree Celsius, and further preferably less than 160 degree Celsius.

The sheet (web W) is formed from a mixture of the defibrated fiber and the additive agent. The defibrated fibers with the fusion-bondable resin and the additive agent are called raw material fibers.

The forming unit 70 deposits the raw material fibers in a constant sheet form. The forming unit 70 has a mechanism which constantly spreads the raw material fibers in the air, and a mechanism which suctions the raw material fibers on a mesh belt.

For the mechanism that spreads constantly the raw material fiber in the air, the forming unit 70 includes a forming drum 71 into which the raw material fibers are fed. The forming drum 71 makes it possible to mix constantly the additive agent to the raw material fibers by rotating. The forming drum 71 has porous screen on a surface thereof. The forming drum 71 rotates to make the raw material fibers pass through the porous screen in order for the raw material fibers to be spread constantly in the air.

On the other hand, the mesh belt 73, which is meshed and endless, is configured in the vertically lower direction of the forming drum 71. The mesh belt 73 is stretched by a plurality of stretching rollers 72, at least one of which rotates such that the mesh belt 73 is moved in a direction.

Also, a suction apparatus 75 is configured in the vertically lower direction of the forming drum 71 to generate air stream via the mesh belt 73 in the vertically lower direction. The suction apparatus 75 can suction the raw material fibers which have been in the air onto the mesh belt 73.

When the raw material fibers are transferred to the forming drum 71 of the forming unit 70, the raw material fibers pass through the porous screen on the surface of the forming drum 71, and are deposited on the mesh belt by suction power of the suction apparatus 75. At this time, since the mesh belt 73 is moved in the one direction, the raw material fibers are constantly deposited. This deposit of the raw material fibers constantly deposited is called web W. The mesh belt 73 can be metallic, resinous, or nonwoven fabric, as long as the mesh belt 73 renders the air stream passing through and material fibers are deposited thereon. If diameters of holes of mesh are too large, the surface will be not even in forming the sheet. If the diameters of the holes of the mesh are too small, it is difficult for the suction apparatus 75 to make the air stream stable. For this reason, the diameters of the holes of the mesh are preferably adjusted, if necessary. The suction apparatus 75 is formed by having a sealed box, opening a window with a desired size on the box under the mesh belt 73, and depressurizing by suctioning the air from parts other than the window The web W is transferred in a web transfer direction, which is indicated by an arrow in FIG. 2, by moving the mesh belt 73.

Here, the measuring unit 110 is configured above the mesh belt 73 on the upstream side of the pressurizing and heating unit 90. The measuring unit 110 acquires the moisture amount information from the web W being transferred from the forming unit 70 to the pressurizing and heating unit 90. Then, the controller 250 is arranged to control the quantity of heat which the pressurizing and heating unit 90 adds to the web W on the basis of the moisture amount information after acquired. In the first embodiment, the web W is also defibrated material The measuring unit 110 can be any kind of sensors. For example, a moisture meter which is a non-contact type and uses an infrared light method can be employed. Other than that, an electric-insulator method, a microwave method, and the like can be used. The contact type possibly may have errors, if the paper powder and the like are attached to the sensor, and frequency of maintenance such as cleaning and the will be high. Therefore, the non-contact method, the infrared-light method, or the microwave method is desirable. It should be selected on the basis of price and size of the apparatus.

The pressurizing unit 80 pressurizes the web W which has been transferred. The pressurizing unit 80 includes two pairs of pressure rollers 81. The pressurizing unit 80 pressurizes the web W, on which the water amount has been sprayed, by letting the web W pass through the pair of pressure rollers 81 facing each other. The web W is transferred to the pressurizing and heating unit 90 thereafter. The pressurizing and heating unit 90 simultaneously heat and pressurize the web W after being transferred. The pressurizing and heating unit 90 includes two pairs of heating rollers 91. The pressurizing and heating unit 90 makes the web W pass through the pair of the heating rollers 91, and heats and pressurizes.

The pressure roller 81 makes fiber intervals shorter. In a state where the number of contact parts between the fibers is increased, the heating rollers 91 fuse the fusion-bondable resin. By this arrangement, the strength of the sheet is enhanced, excessive moisture amount is dried, and superior sheets are produced. Also, it is preferable to heat and pressurize the web W simultaneously by having a heater with the heating roller 91. By the way, a guide 108 is configured under the hearing roller 91 and the pressure rollers 81 to guide the web W.

The web W produced in this way is transferred to the cutting unit 100. The cutting unit 100 includes a cutter 101 which cuts in a transfer direction and a cutter 102 which cuts in a direction perpendicular to the transfer direction. The cutting unit 100 cut the web W, which is in an elongated form, into desired size. A sheet Pr is formed by cutting the web W, and is loaded on the stacker 160.

Next, a method of controlling of the sheet manufacturing apparatus 1 is explained herein. More specifically, the method for controlling the quantity of heat to be added to the defibrated material at the pressurizing and heating unit 90 on the basis of the moisture amount information of the defibrated material is described based on the flowchart in FIG. 3.

First, before the defibrated material is transferred to the pressurizing and heating unit 90, the moisture amount information of the web W as the defibrated material is acquired. In the present embodiment, the measuring unit 110 measures (step S1) the moisture amount of the web W which has been deposited by the forming unit 70. Because the web W is in a continuous form, the moisture amount is measured in a certain area (for unit volume).

Next, the pressurizing and heating unit 90 controls the quantity of heat on the basis of the moisture amount acquired of the web W. More specifically, when the moisture amount of the web W is larger than a prescribed amount, the quantity of heat is the controlled to be larger than when the moisture amount of the web W is less than the prescribed amount. When the moisture amount of the web W is smaller than the prescribed amount, the quantity of heat is controlled to be smaller than when the moisture amount of the web W is larger than the prescribed amount. The quantity of heat can be controlled by controlling a temperature (heating temperature) to the web W as the defibrated material, or by controlling time for which the heating temperature is added to the web W.

In the present embodiment, the controller 250 determines (step S2) whether or not the moisture amount of the web W is larger than the prescribed amount.

For example, the heating temperature includes two temperatures such as higher temperature and lower temperature. When the moisture amount of the web W is larger than the prescribed amount (YES at step S2), the temperature at the heating rollers 91 of the pressurizing and heating unit 90 is set to be the higher temperature (step 3). By doing this, lack of quantity of heat for the web W at the pressurizing and heating unit 90 is resolved. Then, since the tie between fibers becomes enough, the strength of the sheet is maintained.

On the other hand, when the moisture amount of the web W is smaller than the prescribed amount (NO at step S2), the temperature at the heating rollers 91 of the pressurizing and heating unit 90 is set to be the lower temperature (step S4). By this arrangement, heat surplus of the web W at the pressurizing and heating unit 90 is resolved. Therefore, fusing the fusion-bondable resin away is suppressed. The tie between the fibers becomes enough. The strength of the sheet is maintained.

When the moisture amount of the web W is larger than the prescribed amount, it is possible to make the heating time shorter, for which the heating rollers 91 of the pressurizing and heating unit 90 heats. And when the moisture amount of the web W is smaller than the prescribed amount, it is possible to make the heating time longer, for which the heating rollers 91 of the pressurizing and heating unit 90 heats.

In this way as well, the quantity of heat added to the web W is appropriately controlled, and thus the strength of the sheet is maintained.

Figure 3:
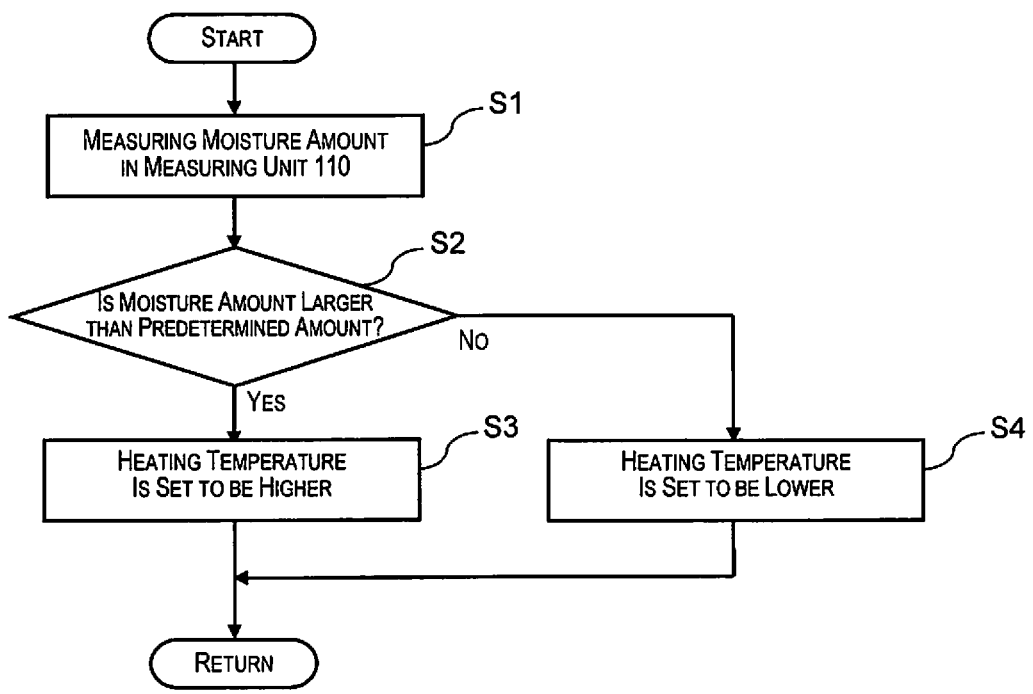
FIG. 3 is a flowchart showing a method of the sheet manufacturing apparatus for controlling quantity of heat according to the first embodiment.

Further, the way to control in the FIG. 3 determines in two ways, namely whether the moisture amount is larger or smaller than the prescribed amount. However, it is not limited to the way. It is fine to have a plurality of threshold values and determine by comparing more than three cases. Further, it is fine to compare acquired moisture amounts, rather than comparing the moisture amount with the prescribed amount. In either case, when the moisture amount of the defibrated material is larger, the quantity of heat to be added to the defibrated material is larger than when the moisture amount of the defibrated is smaller. This is same in other embodiments.

The above-mentioned embodiment has effect which will be explained hereinafter.

(1) The moisture amount of the web W is measured by the measuring unit 110. Then, for example, when the moisture amount of the web W is larger, the quantity of heat to be added to the web W at the pressurizing and heating unit 90 is set to be larger. When the moisture amount of the web W is smaller, the quantity of heat to be added to the web W at the pressurizing and heating unit 90 is set to be smaller. With this arrangement, since the quantity of heat to be added to the web W on the basis of the moisture amount is constant, the tie between the fibers becomes enough, and thus the strength of the sheet is maintained.

(2) Since the measuring unit 110 acquires the moisture amount of the web W right before the pressurizing and heating unit 90, it is possible to control the quantity of heat at the pressurizing and heating unit 90 to be added in a state where change of the moisture amount of the web W is small. Thus, appropriate quantity of heat is added to the web W.

Second Embodiment

First, a configuration of a sheet manufacturing apparatus is described.

Figure 4:
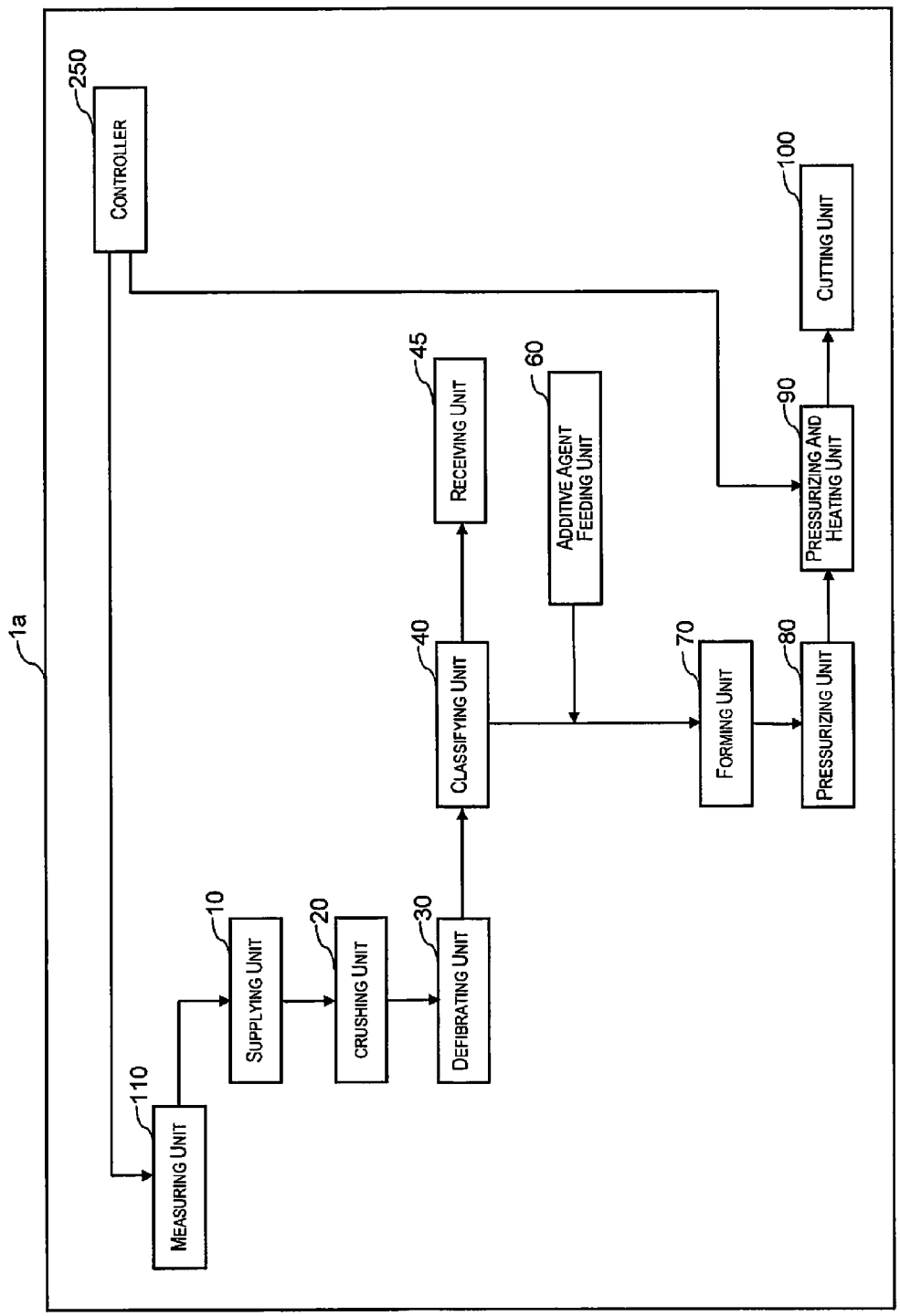
FIG. 4 is a schematic view of a sheet manufacturing apparatus according to a second embodiment.
Figure 5:
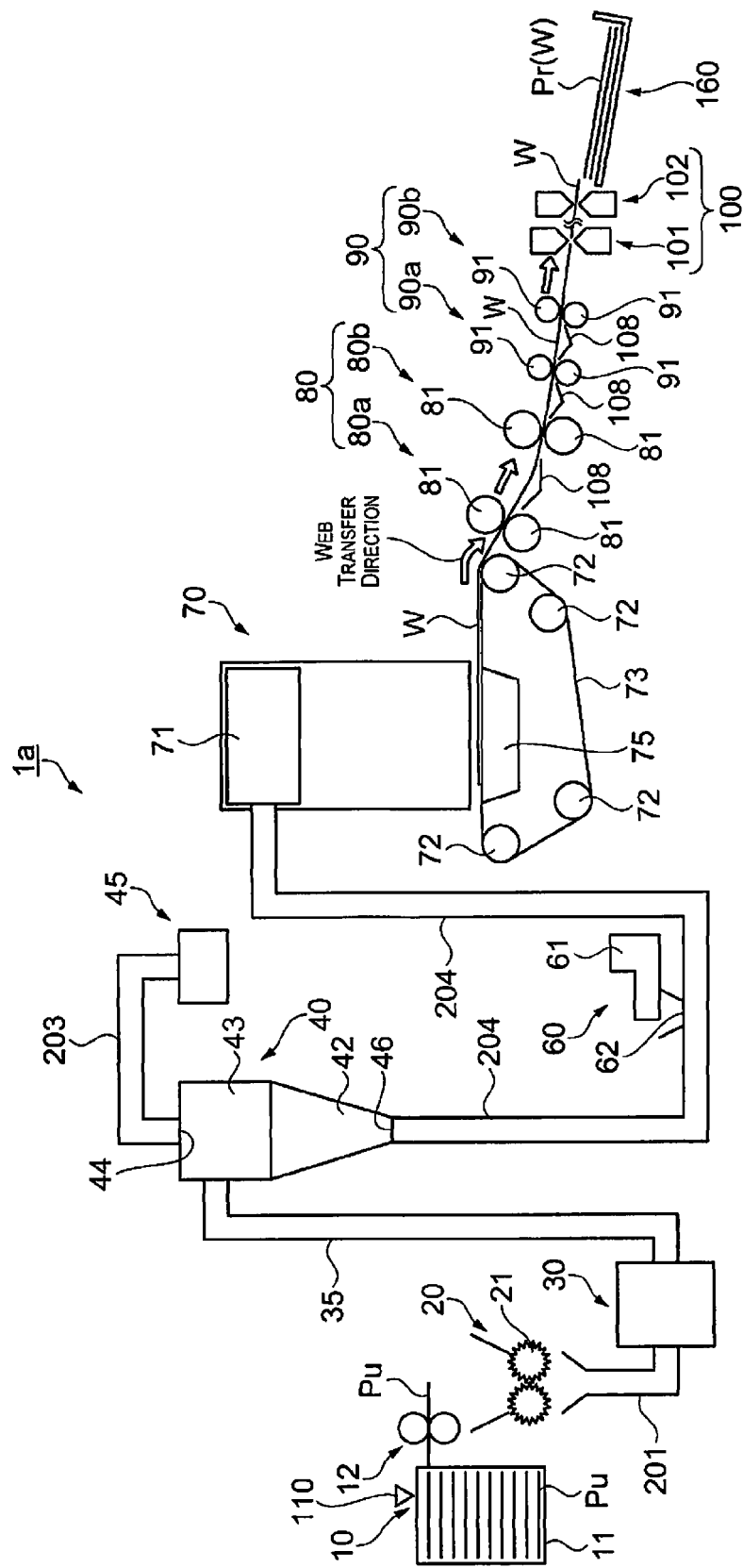
FIG. 5 is a schematic view of the sheet manufacturing apparatus according the second embodiment.

FIGS. 4 and 5 are schematic views showing the configuration of the sheet manufacturing apparatus. As shown in FIGS. 4 and 5, the sheet manufacturing apparatus 1a includes the supplying unit 10, the crushing unit 20, the defibrating unit 30, the classifying unit 40, the receiving unit 45, the additive feeding unit 60, the forming unit 70, the pressurizing unit 80, the pressurizing and heating unit 90, and the cutting unit 100. Further, the sheet manufacturing apparatus 1a includes the measuring unit 110 which acquires the moisture amount information of the defibration object. The measuring unit 110 of the present embodiment is configured on the supplying unit 10. And the sheet manufacturing apparatus 1a includes the controller 250 which controls theses portions.

The measuring unit 110 of the present embodiment is different from one in the first embodiment. Other than that, each portion is same in the first embodiment, and thus description will be omitted. The moisture amount information is information with regards to the moisture amount in the defibration object. For example, the moisture amount, the moisture content ration of the defibration object, or the humidity of the defibration object.

The measuring unit 110 configured on the supplying unit 10 acquires the moisture amount of stock material Pu, as the defibration object, to be supplied. And the controller 250 is arranged to control the quantity of heat added to the web W as the defibrated material at the pressurizing and heating unit 90 on the basis of the moisture amount information of the stock material Pu.

Figure 6:
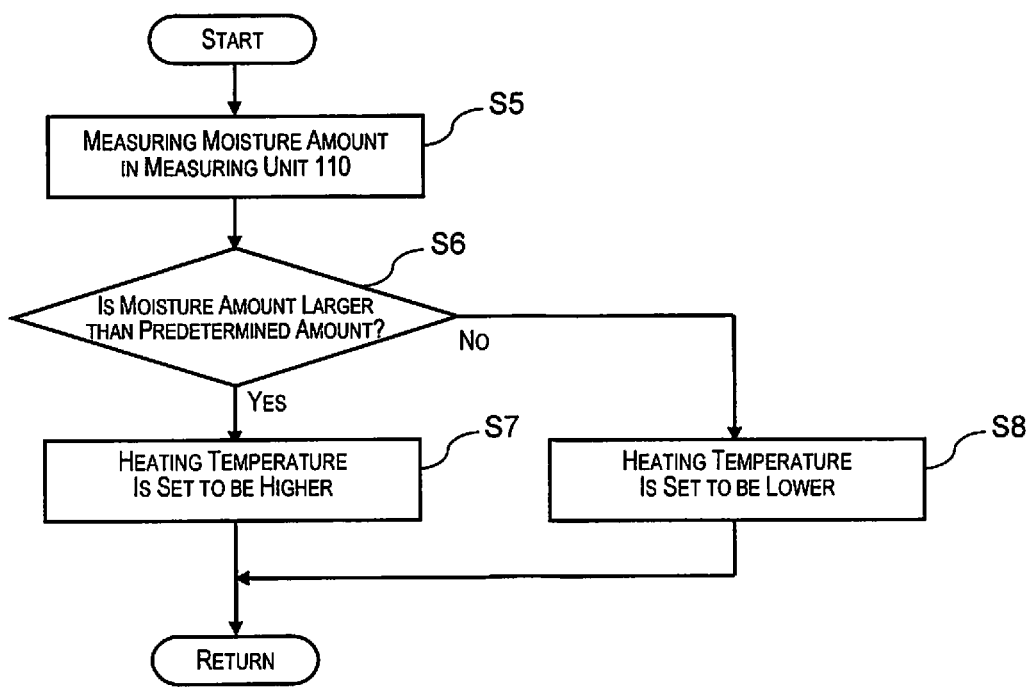
FIG. 6 is a flowchart showing a method of the sheet manufacturing apparatus for controlling quantity of heat according to the second embodiment.

Next, a method of controlling of the sheet manufacturing apparatus 1a is described based on a flowchart in FIG. 6. The moisture amount information is acquired by the measuring part 110 (step S5) of the stock material Pu, as the defibration object, which is loaded on the supplying unit 10 and fed to the crushing unit 20.

Thereafter, the quantity of heat at the pressurizing and heating unit 90 is controlled on the basis of the moisture amount of the stock material Pu after being acquired.

More specifically, as the method for controlling, when the moisture amount of the stock material Pu is larger than the prescribed amount, the quantity of heat is controlled to be larger than when the moisture amount of the stock material Pu is smaller than the prescribed amount. When the moisture amount of the stock material Pu is smaller than the prescribed amount, the quantity of heat is controlled to be smaller than when the moisture amount of the stock material Pu is larger than the prescribed amount. The quantity of heat can be controlled by controlling the temperature (heating temperature) to the web W deposited by the forming unit 70, or by controlling time for which the heating temperature is added to the web W.

In the present embodiment, the controller 250 determines whether or not the moisture amount of the stock material Pu is larger than the prescribed amount (step S6).

When the moisture amount of the stock material Pu is larger (YES at step S6) the temperature to be added at the heating rollers 91 of the pressurizing and heating unit 90 is set to be higher (step S7). With this arrangement, the lack of quantity of heat of the web W at the pressurizing and heating unit 90 is resolved. The tie between fibers becomes enough, and the strength of the sheet is maintained.

On the other hand, the moisture amount of the stock material Pu is smaller than the prescribed amount (NO in step S6), the temperature at the heating rollers 91 of the pressurizing and heating unit 90 is set to be lower (step S8). By this arrangement, the heat surplus to the web W at the pressurizing and heating unit 90 is resolved. Further, fusing the fusion-bondable resin away is suppressed. The tie between fibers becomes enough, and the strength of the sheet is maintained.

When the moisture amount of the web W is larger, it is fine to make the heating time at the heating rollers 91 of the pressurizing and heating unit 90 longer. When the moisture amount of the web W is smaller, it is fine to make the heating time at the heating rollers 91 the pressurizing and heating unit 90 shorter. With this arrangement, the quantity of heat to the web W is controlled, and thus the strength of the sheet is maintained.

Moreover, in controlling in FIG. 6, there is a decision of two ways, whether the moisture amount is larger or smaller than the prescribed amount. However, it is not limited to the decision of two ways, but it is fine to have a decision of more than three ways with a plurality of threshold values. Either the decision of two ways or the decision of three ways, when the moisture amount of the defibrated material is larger, the quantity of heat added to the defibrated material is larger than when the moisture amount is smaller.

There are some processes in a period in which the stock material Pu (defibration object) is transferred from the supplying unit 10 to the pressurizing and heating unit 90. For this reason, the temperature of the pressurizing and heating unit 90 is set after the period in which the defibration object is transferred to the pressurizing and heating unit 90 elapses. It is preferable that the quantity of heat is adjusted by considering certain changes (for example, averaging the moisture amount which has been measured by prescribed time) in the moisture amount of the stock material Pu in the process.

According to the second embodiment, there are effects below.

(1) The moisture amount in a state of the stock material Pu being loaded on the supplying unit 10 is measured by the measuring unit 110. For example, when the moisture amount of the stock material Pu is larger, the quantity of heat to the web W at the pressurizing and heating unit 90 to the web W is set to be larger. When the moisture amount of the stock material Pu is smaller, the quantity of heat at the pressurizing and heating unit 90 is set to be smaller. With this arrangement, since the quantity of heat to be added to the web W on the basis of the moisture amount is constant, the tie between the fibers becomes enough, and thus the strength of the sheet is maintained.

Third Embodiment

First, a configuration of a sheet manufacturing apparatus is described. The sheet manufacturing apparatus of the present embodiment has a function of controlling the moisture amount of the defibrated material on the basis of the moisture amount information of the defibrated material. Further, the sheet manufacturing apparatus has a function of controlling the moisture amount of the defibrated material to be constant on the basis of the moisture amount information of the defibrated material.

Figure 7:
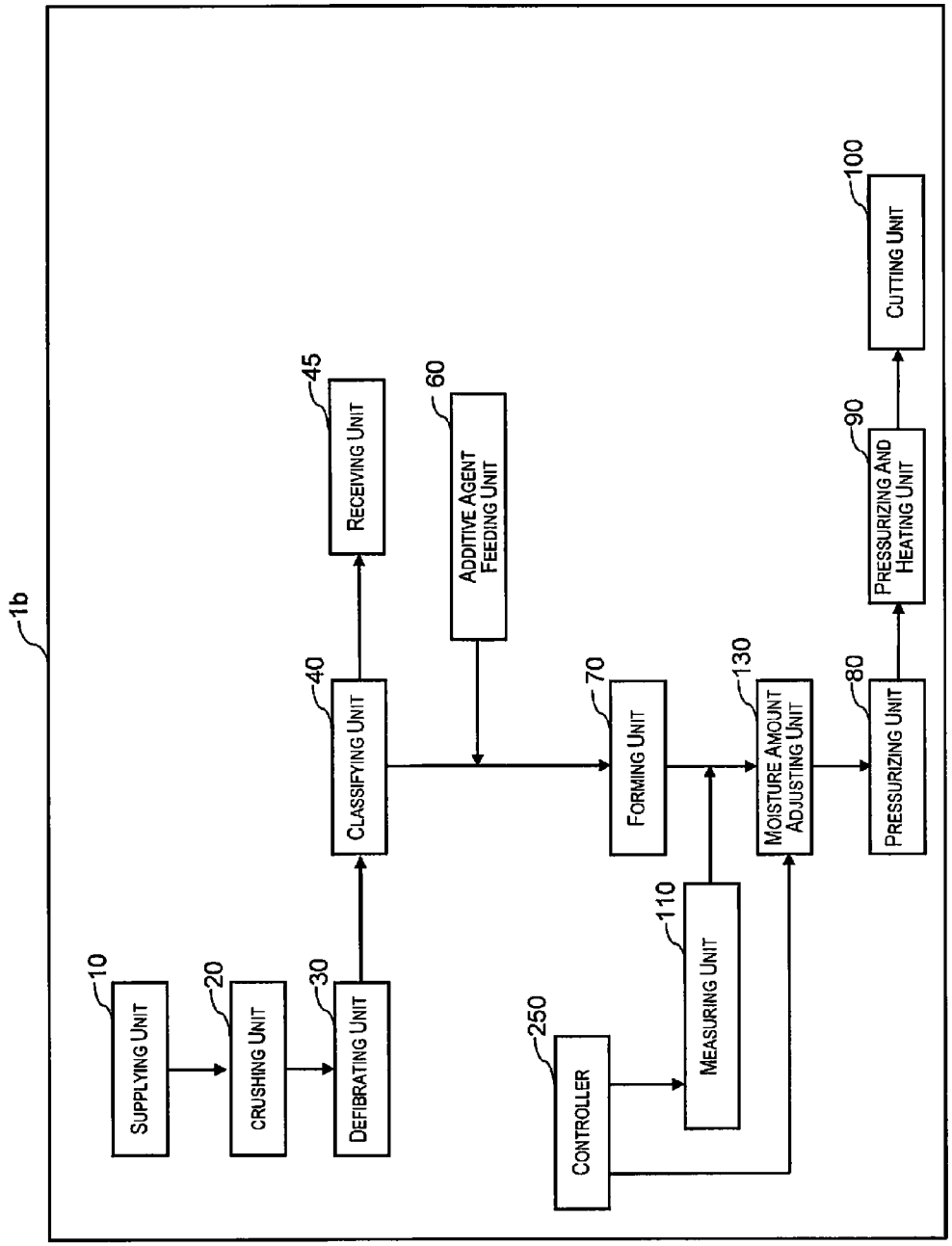
FIG. 7 is a schematic view of a sheet manufacturing apparatus according to a third embodiment.
Figure 8:
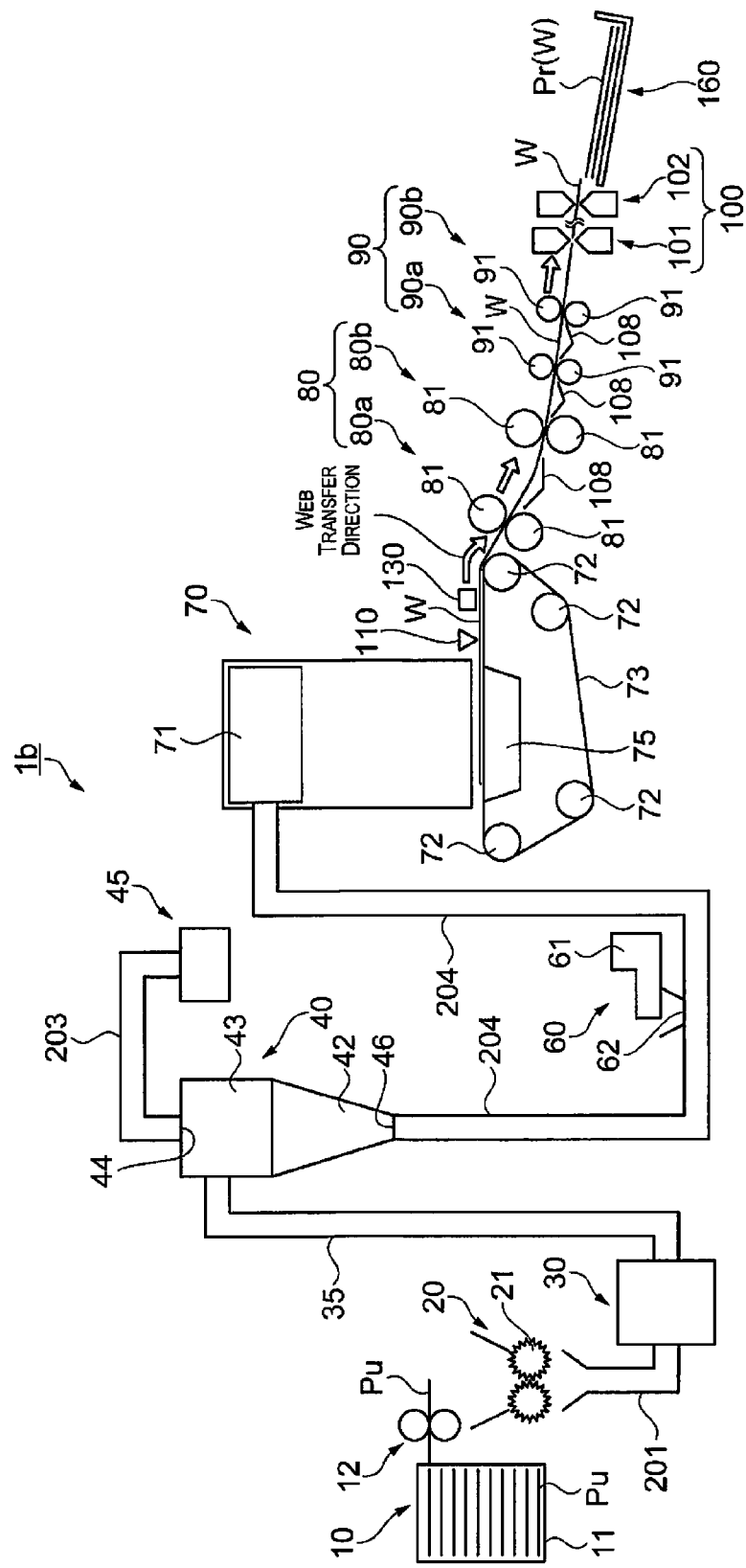
FIG. 8 is a schematic view of the sheet manufacturing apparatus according to the third embodiment.

FIGS. 7 and 8 are schematic views showing the sheet manufacturing apparatus of the present embodiment. As shown in FIGS. 7 and 8, the sheet manufacturing apparatus 1b includes the supplying unit 10, the crushing unit 20, the defibrating unit 30, the classifying unit 40, the receiving unit 45, the additive feeding unit 60, the forming unit 70, the pressurizing unit 80, the pressurizing and heating unit 90, and the cutting unit 100. Further, the sheet manufacturing apparatus includes the measuring unit 110 which acquires the moisture amount information of the defibrated material, and the moisture amount adjusting unit 130 which controls the moisture amount of the defibrated material.

The moisture amount adjusting unit 130 of the present embodiment is configured between the forming unit 70 and the pressurizing and heating unit 90. Also, the measuring unit 110 is configured to acquire the moisture amount of the web W being transferred from the side of the forming unit 70 to the side of the moisture amount adjusting unit 130. Further, the sheet manufacturing apparatus 1b includes the controller 250 which control these portions. The moisture amount adjusting unit 130 of the present embodiment is different from one in the first embodiment. Other than that, each portion is same in the first embodiment, and thus description will be omitted. The moisture amount information is information with regards to the moisture amount in the defibration object. For example, the moisture amount information is the moisture amount, the moisture content ratio of the defibration object, or the humidity of the defibration object.

The moisture amount adjusting unit 130 is configured at a position right before the pressurizing unit 80 and the pressurizing and heating unit 90 to adjust the moisture amount of the web W on the basis of the moisture amount information of the web W as the defibrated material. The moisture amount adjusting unit 130 has a humidity removing function and a humidifying function. The humidity removing function, for example, is to decrease the moisture amount of the web W by applying heated dry air. Also, the humidifying function is to increase the moisture amount of the web W by adding additive for moisture amount.

Figure 9:
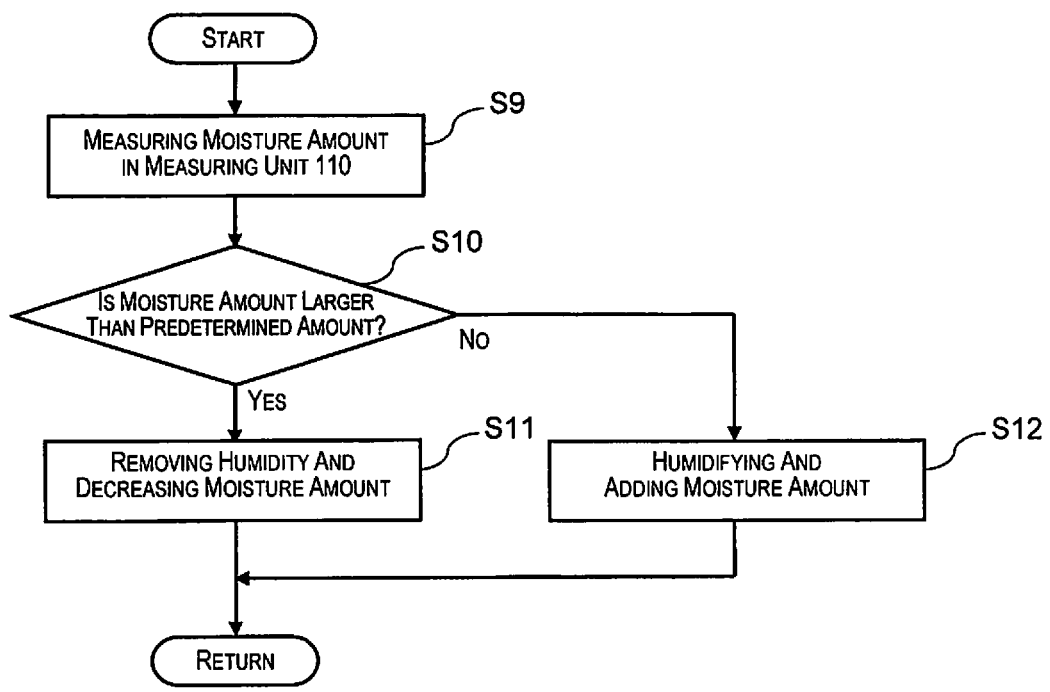
FIG. 9 is a flowchart of a method of the sheet manufacturing apparatus for controlling quantity of heat according to the third embodiment.

A method for controlling of the sheet manufacturing apparatus 1b is described with the reference to a flowchart in FIG. 9. First, the moisture amount information of the web W being transferred from the forming unit 70 is acquired by the measuring unit 110 (step S9).

The moisture amount adjusting unit 130 is controlled on the basis of the moisture amount of the web W after acquired.

In the present embodiment, the controller 250 determined whether or not the moisture amount of the web W is larger than the prescribed amount (step S10).

When the moisture amount is larger than the prescribed amount (YES at step S10), the humidity removing function of the moisture amount adjusting unit 130 decreases the moisture amount (step S11) by removing the humidity of the web W to be the prescribed moisture amount. Then, the pressurizing and heating unit 90 adds the heat and the pressure to the web W with the prescribed moisture amount.

By this arrangement, because the moisture amount of the web W is the prescribed value, the process condition of the pressurizing and heating unit 90 is in a constant state. Because the moisture amount of the web W is constant, not surplus, by the humidity removing function, the lack of quantity of heat to the web W at the pressurizing and heating unit 90 is resolved. The tie between fibers is enough, and the strength of the sheet is maintained.

On the other hand, the moisture amount of the web W is smaller than the prescribed amount (NO in step S10), the moisture amount adjusting unit 130 with the humidifying function humidifies by adding the moisture amount of the web W (step S12) to the prescribed moisture amount. Then, the pressurizing and heating unit 90 adds the heat and the pressure to the web W with the prescribed moisture amount.

By this arrangement, because the moisture amount of the web W is the prescribed amount, the process condition of the pressurizing and heating unit 90 is in the constant state. Because the moisture amount of the web W is constant, not lacked, by the humidifying function, the heat surplus to the web W at the pressurizing and heating unit 90 is resolved. The tie between fibers is enough, and the strength of the sheet is maintained.

The third embodiment has effect which will be explained hereinafter.

(1) The moisture amount of the web W is measured by the measuring unit 110. Then, for example, when the moisture amount of the web W is larger, the humidity removing function of the moisture amount adjusting unit 130 adjusts the moisture amount of the web W to the prescribed moisture amount by decreasing the moisture amount of the web W. When the moisture amount of the web W is smaller, the humidifying function of the moisture amount adjusting unit 130 adjusts the moisture amount of the web W to the prescribed amount by adding the moisture amount. With this arrangement, since the moisture amount of the web W is constant, the process condition of the pressurizing and heating unit 90 is set. The web W being deposited is heated and pressured on the basis of the moisture amount being constant, the tie between fibers becomes enough, and thus the strength of the sheet is maintained.

Fourth Embodiment

A sheet manufacturing apparatus is described hereinafter. The sheet manufacturing apparatus has a function for controlling the moisture amount of the defibration object on the basis of the moisture amount information of the defibration object. Further, the sheet manufacturing apparatus has a function for controlling the moisture amount of the defibration object to be constant on the basis of the moisture amount information of the defibration object.

Figure 10:
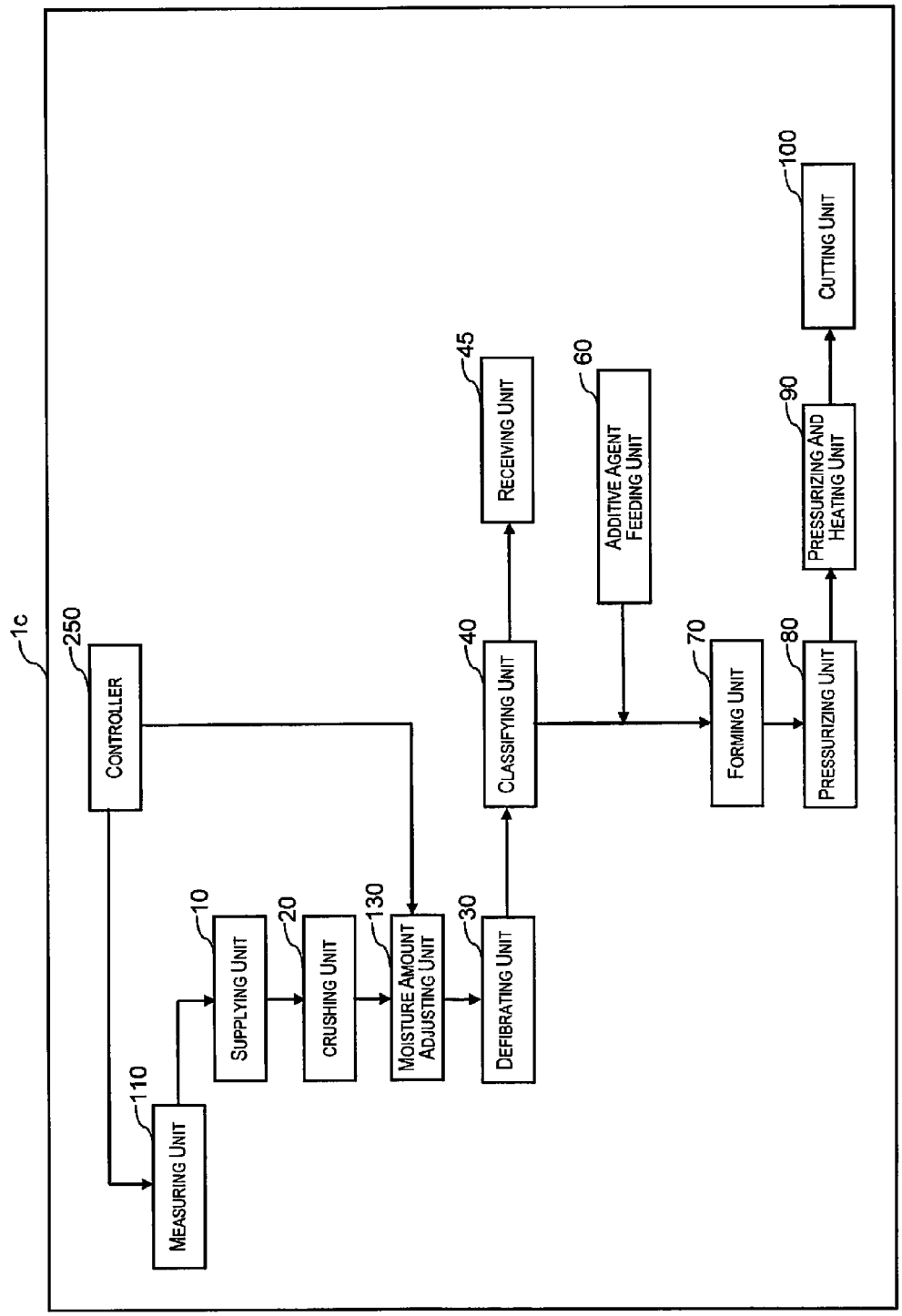
FIG. 10 is a schematic view of a sheet manufacturing apparatus according to a forth embodiment.
Figure 11:
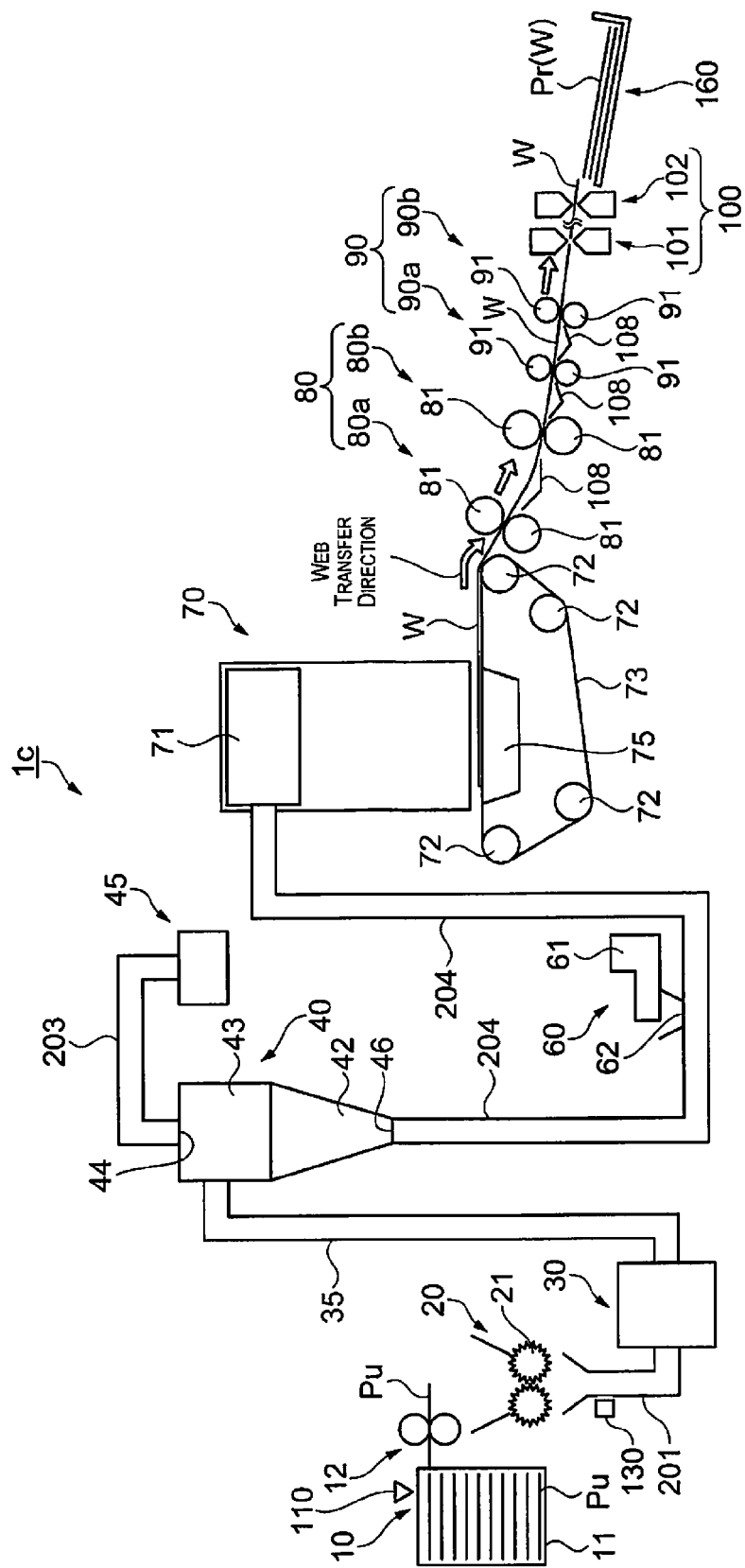
FIG. 11 is a schematic view of the sheet manufacturing apparatus according to the fourth embodiment.

FIGS. 10 and 11 are schematic views of the sheet manufacturing apparatus of the present embodiment. As shown in FIGS. 10 and 11, the sheet manufacturing apparatus 1c includes the supplying unit 10, the crushing unit 20, the defibrating unit 30, the classifying unit 40, the receiving unit 45, the additive feeding unit 60, the forming unit 70, the pressurizing unit 80, the pressurizing and heating unit 90, and the cutting unit 100. Further, the sheet manufacturing apparatus 1c includes the measuring unit 110 which acquires the moisture amount information of the defibration object and the moisture amount adjusting unit 130 which controls the moisture amount included in the defibration object. The sheet manufacturing apparatus 1c includes the controller 250 which controls these portions. The moisture amount information is information with regards to the moisture amount of the defibration object. For example, the moisture amount information is the moisture amount, the moisture content ratio of the defibration object, or the humidity of the defibration object.

The measuring unit 110 of the present embodiment is configured on the supplying unit 10. Also, the moisture amount adjusting unit 130 is configured between the crushing unit 20 and the defibrating unit 30. The configuration of each portion of the present embodiment is same as one in the third embodiment, and thus description will be omitted.

The measuring unit 110 configured on the supplying unit 10 acquires the moisture amount of the stock material Pu as the defibration object being supplied. The controller 250 is configured to control the moisture amount adjusting unit 130 on the basis of the moisture amount information of the stock material Pu after being acquired.

Figure 12:
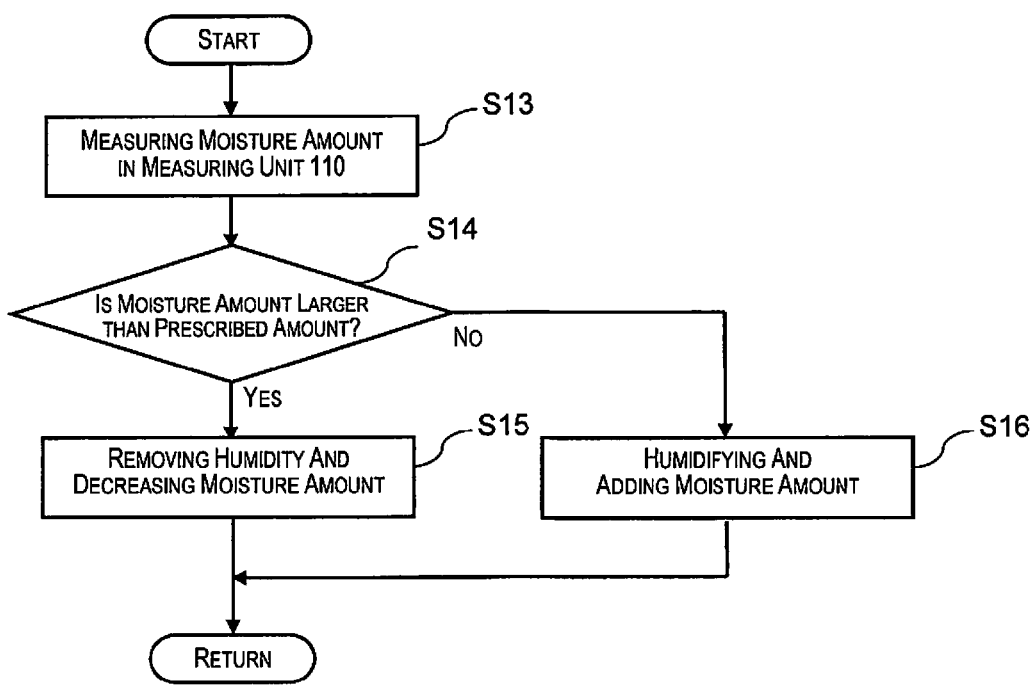
FIG. 12 is a flowchart of a method of the sheet manufacturing apparatus for controlling quantity of heat according to the fourth embodiment.

A method for controlling of the sheet manufacturing apparatus 1c is described with the reference to a flowchart in FIG. 12. First, the moisture amount information of the stock material Pu being loaded on the supplying unit 10 and fed to the crushing unit 20 is acquired by the measuring unit 110 (step S13).

Then, the moisture amount adjusting unit 130 is controlled on the basis of the moisture amount of the stock material Pu.

In the present embodiment, the controller 250 determines whether or not the moisture amount of the stock material Pu is larger than the prescribed amount (step S14).

When the moisture amount of the stock material Pu is larger than the prescribed amount (YES in step S14), the humidity removing function of the moisture amount adjusting unit 130 removes the humidity from a small piece and decreases the moisture amount (step S15) to the prescribed moisture amount. Then, the small piece with the prescribed moisture amount is transferred to the side of the defibrating unit 30. After that, the heat and pressure are added to the web W by the pressurizing and heating unit 90.

By this arrangement, because the moisture amount of the web W is the prescribed amount, the process condition of the pressurizing and heating unit 90 is in the constant state. Because the moisture amount of the web W is the prescribed amount, not surplus, by the humidity removing function, the lack of quantity of heat to the web W at the pressurizing and heating unit 90 is resolved. The tie between the fibers becomes enough, and the strength of the sheet is maintained.

On the other hand, when the moisture amount of the stock material Pu is smaller than the prescribed amount (NO in step S14), the humidifying function of the moisture amount adjusting unit 130 increases the moisture amount by humidifying the small piece to be the prescribed moisture amount (step S16). Then, the small piece with the prescribed moisture amount is transferred to the side of the defibrating unit 30. After that, the heat and the pressure are added to the web W by the pressurizing and heating unit 90.

By this arrangement, because the moisture amount of the web W is the prescribed amount, the process condition of the pressurizing and heating unit 90 does not have to be changed. Because the moisture amount of the web W is the prescribed amount by the humidifying function and not lacked, the heating surplus to the web W at the pressurizing and heating unit 90 is resolved. Therefore, fusing the fusion-bondable resin away is suppressed. The tie between the fibers becomes enough. The strength of the sheet is maintained.

There are some processes from the supplying unit 10 to the pressurizing and heating unit 90. For this reason, the temperature of the pressurizing and heating unit 90 is set after the period in which the defibration object is transferred to the pressurizing and heating unit 90 elapses. It is preferable that the moisture amount is adjusted by the moisture amount adjusting unit 130 in considering the certain changes (for example, averaging the moisture amount which has been measured by prescribed time) in the moisture amount of the stock material Pu in the process.

According to the fourth embodiment, it is possible to attain effect below.

(1) The moisture amount of the stock material Pu is measured by the measuring unit 110. Then, for example, when the moisture amount of the stock material Pu is larger, the humidity removing function of the moisture amount adjusting unit 130 adjusts the moisture amount to the prescribed moisture amount by decreasing the moisture amount of the small piece. When the moisture amount of the stock material Pu is smaller, the humidifying function of the moisture amount adjusting unit 130 adjusts the moisture amount to the prescribed amount by adding the moisture amount to the small piece. With this arrangement, since the moisture amount of the web W is constant, the process condition of the pressurizing and heating unit 90 is set. The web W being deposited is heated and pressured on the basis of the moisture amount being constant, the tie between fibers becomes enough, and thus the strength of the sheet is maintained.

The present invention is not limited to the above mentioned embodiments. It is possible to add various kinds of changes to the above mentioned embodiments. Modified examples are described hereinafter.

In the first and second embodiments, the measuring unit 110 acquires the moisture amount of the defibrated material or the defibration object, and control the quantity of heat at the pressurizing and heating unit 90 on the basis of the moisture amount after being acquired. However, the present invention is not limited to this arrangement. For example, the sheet manufacturing apparatus 1, 1a includes an outside air sensor which acquires information with regards to a state of the outside air in adjacent areas. The state of the outside air (temperature, humidity, and the like) which the outside air sensor acquires can be measured. In this case, the state of the outside air which acquired by the outside air sense becomes the moisture amount information of the defibration object or the defibrated material. And the quantity of heat by the pressurizing and heating portion 90 to the web W can be controlled on the basis of the state of the outside air which acquired by the outside air sense. With this arrangement, the configuration of the sheet manufacturing apparatus 1, 1a and the pressurizing and heating unit 90 depending on the state of outside air can be controlled. The outside air sensor can be a substitute of the measuring unit 110. Or the outside air sensor can be used with the measuring unit 110 in parallel.

In the third and fourth embodiments, the measuring unit 110 acquires the moisture amount of the defibrated material or the defibration object. The moisture amount adjusting unit 130 is controlled on the basis of the moisture amount after being acquired. The present invention is not limited to this arrangement. For example, the sheet manufacturing apparatus 1b, 1c includes the outside air sensor which acquires information with regards to the state of the outside air in adjacent areas. The state of the outside air (temperature, humidity, and the like) which the outside air sensor acquires can be measured. In this case, the state of the outside air which acquired by the outside air sense becomes the moisture amount information of the defibration object or the defibrated material. And the moisture amount adjusting unit 130 can be controlled on the basis of the state of the outside air which is acquired by the outside air sense. With this arrangement, the configuration of the sheet manufacturing apparatus 1b, 1c and the moisture amount adjusting unit 130 depending on the state of outside air can be controlled. The outside air sensor can be a substitute of the measuring unit 110. Or the outside air sensor can be used with the measuring unit 110 in parallel.

In the present embodiment, mainly the sheet is made of material of plant fibers, such as cellulose. However, the sheet is not limited to it. The sheet can have a board form, a web form, or asperity. Also, the material can be plastic fibers such as PET (polyethylene terephthalate), or animal hair such as sheep wool. In other words, the material can be things that may need to increase the degree of whiteness. More specifically, the material can be pure pulp in a sheet form, used paper and the like in the sheet form, nonwoven fabric, fiber board, tissue paper, paper towel, cleaner, filter, water absorbing material, sound absorbing body, cushioning material, or mattress.

"Making the moisture amount constant" and "making the moisture amount to be the prescribed amount" mean making the moisture amount same, but it is quite difficult to make it completely same. Constant and prescribed amount can vary.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A sheet manufacturing apparatus comprising:
a defibrating unit configured to defibrate a defibration object including at least a fiber, in air, the sheet manufacturing apparatus forming a sheet by adding quantity of heat to a defibrated material defibrated at the defibrating unit;
a measuring unit configured to acquire moisture amount information of the defibrated material defibrated at the defibrating unit, or the defibration object to be defibrated at the defibrating unit; and
a controller configured to control the quantity of heat to be added to the defibrated material based on the moisture amount information acquired by the measuring unit.

2. The sheet manufacturing apparatus according to claim 1, wherein
the controller increases the quantity of heat when, in the moisture amount information, moisture amount of the defibrated material or the defibration object is larger relative to when the moisture amount of the defibrated material or the defibration object is smaller.

3. The sheet manufacturing apparatus according to claim 2, wherein
the quantity of heat is based on at least one of heating temperature to be added to the defibrated material and a time for which the heating temperature is added to the defibrated material.

4. A sheet manufacturing apparatus comprising:
a defibrating unit configured to defibrate a defibration object including at least a fiber, in air, the sheet manufacturing apparatus forming a sheet by adding quantity of heat to a defibrated material defibrated at the defibrating unit;
a measuring unit configured to acquire moisture amount information of the defibrated material defibrated at the defibrating unit, or the defibration object to be defibrated at the defibrating unit; and
a controller configured to control moisture amount of the defibrated material or the defibration object based on the moisture amount information acquired by the measuring unit.

5. The sheet manufacturing apparatus according to claim 4, wherein
the controller controls the moisture amount of the defibration object or the defibrated material to be constant based on the moisture amount information.

6. The sheet manufacturing apparatus according to claim 5, wherein
the controller controls the moisture amount to be constant by drying the defibrated material or the defibration object.

7. The sheet manufacturing apparatus according to claim 6, wherein
the sheet is formed by pressurizing and heating the defibrated material that has been dried.

8. The sheet manufacturing apparatus according to claim 5, wherein
the controller adds moisture to the defibrated material or the defibration object in order for the moisture amount to be constant.

* * * * *